US009777941B2

(12) United States Patent
Grimaldi et al.

(10) Patent No.: US 9,777,941 B2
(45) Date of Patent: Oct. 3, 2017

(54) HEAT RECOVERY VENTILATOR AND ROTARY DAMPER ASSEMBLY

(71) Applicant: Metal Logix Design and Fabrication Inc., Utica, NY (US)

(72) Inventors: Joel A. Grimaldi, New Hartford, NY (US); Robert J. Fischer, Webster, NY (US)

(73) Assignee: Metal Logix Design and Fabrication Inc., Utica, NY (US)

(*) Notice: Subject to any disclaimer, the term of this patent is extended or adjusted under 35 U.S.C. 154(b) by 364 days.

(21) Appl. No.: 14/692,554

(22) Filed: Apr. 21, 2015

(65) Prior Publication Data

US 2016/0313024 A1 Oct. 27, 2016

(51) Int. Cl.
*F28D 17/00* (2006.01)
*F24F 13/10* (2006.01)
*F24F 12/00* (2006.01)
*F24F 11/00* (2006.01)

(52) U.S. Cl.
CPC ............ *F24F 13/10* (2013.01); *F24F 12/006* (2013.01); *F24F 2011/0056* (2013.01); *F24F 2012/008* (2013.01); *Y02B 30/563* (2013.01)

(58) Field of Classification Search
CPC .... F24F 13/10; F24F 12/006; F24F 2012/008; F24F 2011/0056; F24F 13/14; F24F 13/1406; F24F 13/1426; F24F 2013/1433
USPC ........................................................ 165/4
See application file for complete search history.

(56) References Cited

U.S. PATENT DOCUMENTS

| 1,590,408 | A |   | 6/1926  | Bell et al.         |
|-----------|---|---|---------|---------------------|
| 2,701,129 | A |   | 2/1955  | Yerrick             |
| 3,047,272 | A |   | 7/1962  | Speca               |
| 3,286,732 | A |   | 11/1966 | Alley               |
| 4,688,626 | A |   | 8/1987  | Tengesdal           |
| 5,183,098 | A | * | 2/1993  | Chagnot ...... F24F 3/1423 165/54 |
| 5,193,610 | A |   | 3/1993  | Morissette et al.   |

(Continued)

FOREIGN PATENT DOCUMENTS

| CA | 2726001 A1 | 7/2010 |
|----|------------|--------|
| CA | 2726004 A1 | 7/2010 |

(Continued)

*Primary Examiner* — Len Tran
*Assistant Examiner* — Claire Rojohn, III
(74) *Attorney, Agent, or Firm* — Lawrence P. Trapani, Esq.

(57) ABSTRACT

A damper assembly in a heat recovery ventilator, comprising a rotor, a bearing, drive means, and sealing means. The rotor rotates about an axis of rotation and includes a pair of end walls in spaced-apart relation to define a substantially open periphery. The rotor also includes an air-deflecting member connected between the end walls. The bearing is associated with one of the end walls and is located at the axis of rotation, to support rotation of the rotor. The drive means rotates the rotor about the axis of rotation and positions the air-deflecting member in first and second orientations. The sealing means is in slide contact engagement with the rotor and seals between the rotor and a surrounding damper compartment of the ventilator. The sealing means isolates the exhaust airstream from the supply airstream in the damper compartment while the air-deflecting member is in the first or the second orientation.

21 Claims, 9 Drawing Sheets

(56) References Cited

U.S. PATENT DOCUMENTS

| | | |
|---|---|---|
| 5,333,838 A | 8/1994 | Garcia-Malloi |
| 5,372,182 A * | 12/1994 | Gore .................. F24F 1/02 165/137 |
| 5,450,894 A | 9/1995 | Inoue |
| 6,039,109 A * | 3/2000 | Chagnot ............ F24F 3/1423 165/10 |
| 6,257,317 B1 | 7/2001 | DeGregoria et al. |
| 6,289,974 B1 | 9/2001 | DeGregoria et al. |
| 6,450,244 B1 | 9/2002 | Bassilakis |
| 6,565,999 B1 | 5/2003 | Haogland |
| 6,575,228 B1 * | 6/2003 | Ragland ............ F24F 3/1411 165/54 |
| 6,742,516 B2 * | 6/2004 | McCarren ............ F23L 5/02 126/504 |
| 6,880,359 B2 | 4/2005 | Pearson et al. |
| 6,889,750 B2 | 5/2005 | Lagace et al. |
| 7,059,385 B2 * | 6/2006 | Moilala ............ F24F 3/1411 165/4 |
| 7,073,566 B2 | 7/2006 | Lagace et al. |
| 7,334,632 B2 | 2/2008 | Bassilakis |
| 7,410,533 B2 * | 8/2008 | Yabu .................. F24F 3/1411 55/506 |
| 7,441,586 B2 | 10/2008 | Chung et al. |
| 7,458,228 B2 | 12/2008 | Lagace et al. |
| 7,513,823 B1 | 4/2009 | Dix |
| 7,533,691 B2 | 5/2009 | Marcoux et al. |
| 7,565,923 B2 * | 7/2009 | Liu .................. F23L 15/02 165/104.21 |
| 7,572,179 B2 * | 8/2009 | Choi .................. F24F 3/1411 165/54 |
| 7,635,296 B2 | 12/2009 | Gagnon et al. |
| 2003/0013407 A1 * | 1/2003 | Gagnon .............. F04D 25/166 454/237 |
| 2006/0252363 A1 * | 11/2006 | Charlebois ............ F24F 12/006 454/188 |
| 2006/0283967 A1 * | 12/2006 | Cho .................. F24F 3/1423 237/12.1 |
| 2010/0224688 A1 * | 9/2010 | Yabu .................. B01D 53/261 236/44 A |
| 2011/0076933 A1 | 3/2011 | Stenfors |
| 2011/0076934 A1 | 3/2011 | Stenfors |
| 2011/0189937 A1 * | 8/2011 | Hasegawa ............ F24F 12/006 454/239 |
| 2012/0064818 A1 | 3/2012 | Kurelowech |
| 2013/0248147 A1 * | 9/2013 | Wintemute ............ F28F 27/02 165/96 |
| 2016/0265805 A1 * | 9/2016 | Landry ................ F24F 12/006 |

FOREIGN PATENT DOCUMENTS

| | | |
|---|---|---|
| SE | WO2010074641 A1 | 7/2010 |
| SE | WO2010085209 A1 | 7/2010 |

\* cited by examiner

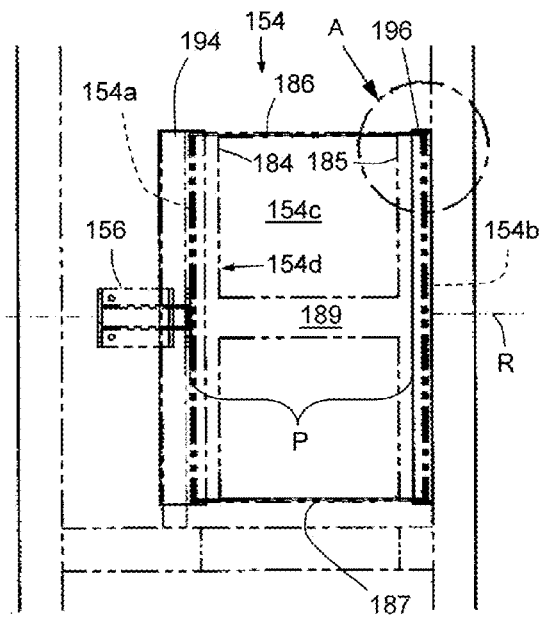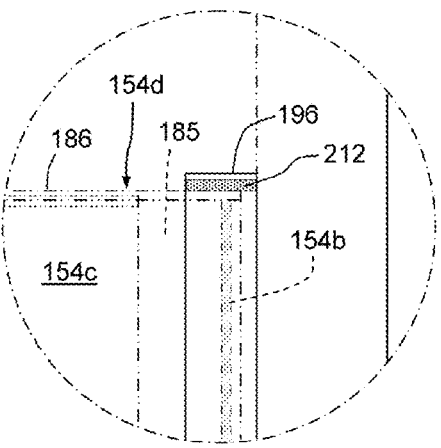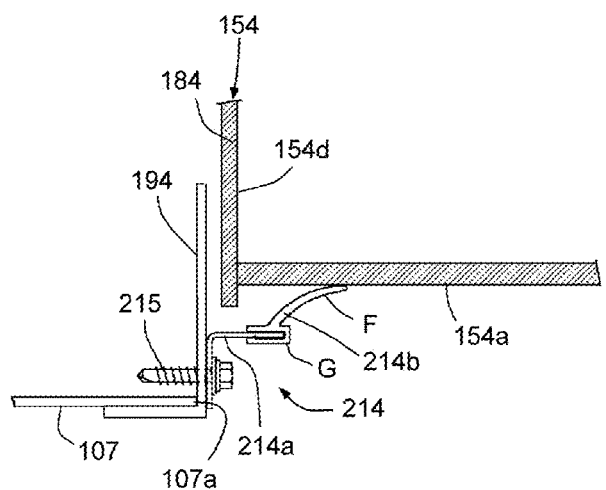
FIG. 8
FIG. 8A
FIG. 9

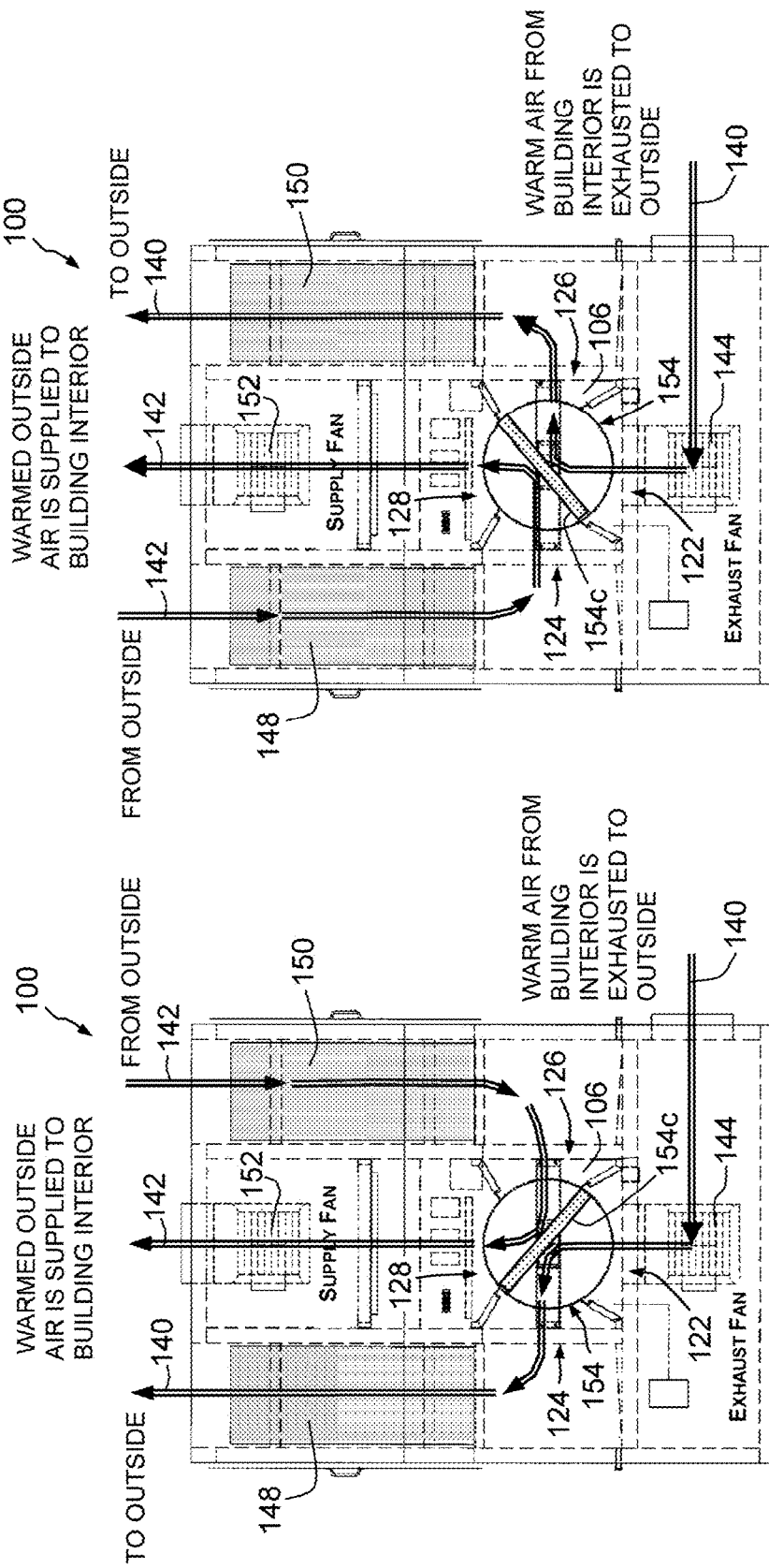

HEAT RECOVERY VENTILATOR AND ROTARY DAMPER ASSEMBLY

BACKGROUND OF THE INVENTION

Field of Invention

The present invention relates generally to building ventilation systems, and more particularly to an air-to-air regenerative heat recovery ventilator (HRV) employing a rotary damper assembly suitable for HRV and other applications.

Background Art

Ventilation systems have become an indispensable part of a building's construction since laws, regulations and building codes have required increased energy-saving measures, such as insulation, weather stripping, and other means for sealing the interior of a building from the outside climate. Sealed buildings require a regular supply of fresh air to maintain a safe and comfortable environment in the interior space. Building ventilation systems provide this supply of fresh air. However, when the air in the interior space is replaced on a frequent basis, the heating, air conditioning, humidifying, and dehumidifying systems of the building are called into operation on a frequent basis to heat, cool or otherwise condition the fresh air, which results in an increase in energy consumption. In order to mitigate this increase in energy consumption, a heat recovery ventilator (HRV) can be employed between the outside of the building and the building's ventilation system. HRVs include one or more heat exchangers for recovering heat during the ventilation process. The building's ventilation system creates a supply airstream by drawing fresh air in from outside, and creates an exhaust airstream by exhausting stale air out to the outside. Usually, an "air-to-air" HRV is employed, using heat exchangers to transfer heat between the supply and exhaust airstreams. It is "air-to-air" because it transfers heat between two airstreams. In the winter months, the exhaust airstream is the warmer and more humid of the two airstreams, and thus the heat exchangers of the HRV transfer heat (sensible and latent) from the exhaust airstream to the supply airstream. In the summer months, the supply airstream is the warmer and more humid of the airstreams, and thus the heat exchangers transfer heat (sensible and latent) from the supply airstream to the exhaust airstream.

One particular type of air-to-air HRV is a "fixed bed" regenerative HRV. It is "fixed bed" because it uses fixed (stationary) heat exchangers, and it is "regenerative" because each heat exchanger temporarily stores heat and then later releases it (i.e., regenerates the heat). This type of HRV has at least two heat exchangers and a mechanism for routing and rerouting the exhaust and supply airstreams through the heat exchangers in an alternating fashion. For example, a warm exhaust airstream is initially made to flow through a first heat exchanger ("HE") and transfer its heat to the first HE ("hot period"), and a cool supply airstream is initially made to flow through a second HE and absorb heat energy previously stored in the second HE ("cold period"). After a certain time interval, the airstreams are switched, so the cool supply airstream flows through the first HE and absorbs the heat stored there during the previous period, and the warm exhaust airstream flows through the second HE and transfers its heat to the second HE, which was cooled during the previous period. A HE is said to have completed one cycle of operation after undergoing both a hot and cold period. By using at least two HEs in such alternating fashion, essentially continuous heat transfer operation is achieved between the airstreams. Each HE contains a storage mass or matrix suitable for storing and releasing sensible and latent heat energy from the airstreams. Examples of such fixed bed, air-to-air regenerative HRVs are disclosed in U.S. Pat. No. 6,450,244 and U.S. Patent App. Pub. No. 2011/0076934.

In some air-to-air regenerative HRVs, the mechanism for switching the airstreams includes a damper that reciprocates between first and second air-deflecting positions. The damper is a generally flat rectangular member that simultaneously deflects both exhaust and supply airstreams. The damper causes the exhaust and supply airstreams to be routed to first and second HEs, respectively, when it is in the first air-deflecting position, and routed to the second and first HEs, respectively, when in the second air-deflecting position. An example of an HRV with such a damper is shown in FIGS. 1, 4a & 4b of U.S. Pat. No. 6,450,244. This type of HRV with reciprocal damper has proven to be an effective system. However, the damper requires compression sealing around all of its four edges when it is in one of the air-deflecting positions. Sealing is required to isolate one airstream from another. In this type of HRV, the damper plays a critical role in effecting the seal along these edges. The damper compresses the seals (against metal stops) along the damper's edges to create an air-tight or air-resistant seal. The fact that the damper serves as part of the sealing mechanism and its compression against another part of the seal is required, imposes certain enhanced structural and force requirements on the damper. The damper must be rigid and strong enough to be compressed against the seals with adequate force. Movement of the damper between the air-deflecting positions requires more than a positioning force; it further requires a compression force to effectuate the seal.

A better understanding of the above can be had by considering FIGS. 1 and 2 herein. FIG. 1 shows the construction of a prior art damper assembly 10. Assembly 10 includes a damper 12 having a structural steel tube frame 14 covered on each broad side with a sheet-metal skin 16a, 16b. Due to the weight of damper 12, three sturdy bearings 18a, 18b, 18c are employed to support the damper for reciprocating rotational movement about an axis 20. Damper 12 is mounted in a housing 22 (FIG. 2). Bearing 18a is mounted on or in a side wall or floor of housing 22 (mounting not shown). A lower drive shaft 24 rotatably engages bearing 18a and is attached to a first end of frame 14 (along axis 20). An upper drive shaft 26 extends through bearing 18b at a first end and through bearing 18c at a second end. The first end of shaft 26 is attached to a second, opposing end of frame 14 (along axis 20). Drive shaft 26 extends to the exterior of housing 22 and includes a crank arm 28 fixed to the shaft. Crank arm 28 is connected to a piston arm of a pneumatic cylinder actuator 30. Actuator 30 is mounted on a steel frame 32. Steel frame 32 is situated between damper 12 and bearing 18b. Bearing 18b is mounted on steel frame 32. Actuator 30 is enclosed by an actuator cage 34 on frame 32. Bearing 18c is mounted on top of actuator cage 34. Actuator 30 is connected, via a compressed air line (not shown), to an air compressor 36. Compressor 36 provides the pneumatic force to move the arm of actuator 30 between extended and retracted positions, causing arm 28 to move damper 12 between air-deflecting positions. A damper reversing valve 37 is also included to reverse the action of actuator 30. A utility housing 38 may be provided to house frame 32, bearing 18b, drive shaft 26, crank arm 28, actuator 30, cage 34, bearing 18c, reversing valve 37, compressor 36, and perhaps electronic controls (not shown).

FIG. 2 is a schematic illustration of the prior art damper seal arrangement. FIG. 2 shows damper 12 in cross-section (along a line perpendicular to axis 20). Mounted on a housing wall 40 is an arrangement of compression-type damper (or side) seals 42a, 42b, 42c and 42d, each of which is affixed to an elongated metal stop 43. A matching arrangement of damper seals and stops are mounted on an opposing wall of housing 22 (out of the paper). Depending on the orientation of damper 12, wall 40 could be a side wall, floor or ceiling of housing 22. Running between wall 40 and the opposing wall of housing 22 are compression-type transverse (or end) seals 44a, 44b, 44c and 44d, also backed by metal stops, respectively. As understood from FIG. 2, all four edges of damper 12 are sealed when damper 12 is forced against seals 42a-42d and seals 44a-44d in either air-deflecting position.

FIGS. 1 and 2 make clear that the prior art damper is a significant steel frame structure with the attendant weight. The weight is substantial enough to require three sturdy bearings, two drive shafts, and a crank arm. It also requires a pneumatic drive system to move it between operative positions and to compress it against an intricate arrangement of seals. The pneumatic cylinder produces such force that it requires a strong steel support frame to hold it in position. And, of course, the drive system requires a supply of compressed air or a compressor. Thus, the damper, damper seals, and pneumatic drive system make up an elaborate damper assembly, which comes with a cost in materials, assembly, and maintenance over the life of the HRV. Also, the pneumatically driven damper creates noise. It will make a thumping sound when it is compressed against the seals. The volume of the thump can be reduced by reducing the speed of the damper, but proper damper operation requires the damper to move as fast as possible. Thus, a tradeoff exists between optimum damper speed and the volume of noise of the damper. The compressor and pneumatic cylinder actuator also emit noise during their operation. A need plainly exists for a quieter, simpler and more cost effective damper assembly in a fixed bed, air-to-air regenerative HRV.

Fixed bed, air-to-air regenerative HRVs have been made without a pneumatic drive system. For example, U.S. Patent App. Pub. No. 2011/0076934 discloses the use of electric motors to operate dampers in an HRV; however, four dampers and at least two electric motors are required. Another example is in U.S. Pat. No. 6,257,317, which discloses the use of an electric motor to drive a rotating "air switch." The air switch rotates in 90 degree steps, over 360 degrees, in a process that alternately directs airstreams between HEs. The air switch has openings in its side walls to produce axially directed flows of the airstreams between the air switch and the HEs. Other examples of similar rotating air switches or valves in HRVs are shown in the following patents: U.S. Pat. No. 2,701,129; U.S. Pat. No. 3,047,272; U.S. Pat. No. 4,688,626: and U.S. Pat. No. 7,441,586.

OBJECTS AND SUMMARY OF THE INVENTION

It is therefore an object of the present invention to overcome the problems associated with the prior art and to fulfill the aforementioned need.

It is another object of the present invention to provide an air-to-air regenerative HRV having a damper assembly that has a minimal role in effecting a seal between a damper and its operative surroundings.

It is a further object of the present invention to provide an air-to-air regenerative HRV having a damper assembly that effects a seal between the damper and its surroundings without pushing or pulling the damper into compressed engagement with seals.

It is yet another object of the present invention to provide an air-to-air regenerative HRV having a damper assembly with a sealing arrangement that does not significantly interfere with the movement and positioning of the damper.

It is yet a further object of the present invention to provide an HRV damper assembly having a damper, the weight and structural requirements of which are reduced relative to prior art.

It is still another object of the present invention to provide an HRV damper assembly having a drive system with reduced power requirements, reduced number of parts and support structure, and reduced physical size and weight.

It is still a further object of the present invention to provide an HRV damper assembly having lower manufacturing and maintenance costs.

These and other objects are attained in accordance with the present invention, wherein there is provided an HRV for transferring heat energy between an exhaust airstream and a supply airstream of a building. The exhaust airstream is received from the inside of the building via an exhaust channel and the supply airstream is delivered to the inside of the building via a supply channel. The HRV comprises first and second regenerative HEs, a damper compartment, and a damper assembly. Each of the HEs has an outside end coupled to the outside of the building and an inside end. Each of the HEs allows air to pass therethrough between the inside end and the outside end. The damper compartment contains an exhaust opening, a supply opening, and first and second heat-exchange openings. The compartment is coupled to the inside ends of the first and second heat exchangers via the first and second heat-exchange openings, respectively. The compartment is coupleable to the exhaust and supply channels of the building via the exhaust and supply openings, respectively. When the compartment is coupled to the exhaust and supply channels, and during operation of the HRV, the exhaust airstream enters the damper compartment through the exhaust opening and the supply airstream exits the damper compartment through the supply opening. The HRV may also comprise an exhaust fan and a supply fan. In such case, the damper compartment is coupled to the exhaust fan and the supply fan via the exhaust and the supply openings, respectively. The exhaust fan moves the exhaust airstream from the inside of the building, into the damper compartment, through one of the HEs, and to the outside. The supply fan moves the supply airstream from the outside, through one of the HEs, into the damper compartment, and to the inside of the building.

The damper assembly of the HRV is situated substantially within the damper compartment and includes a rotor, a drive system, and seals. The rotor is mounted for rotation about an axis of rotation. The rotor has first and second solid end walls disposed in spaced-apart relation along the axis of rotation. The spaced-apart end walls define a substantially open, circumferential periphery surrounding the axis of rotation. The periphery is substantially aligned and in fluid communication with the exhaust and supply openings and with the first and second heat-exchange openings of the damper compartment. The rotor also has an air-deflecting member (e.g., a damper blade), solidly connected between the first and the second end walls. The drive system of the damper assembly is coupled to the rotor and rotates the rotor about the axis of rotation to position the air-deflecting member in a first air-deflecting orientation and in a second air-deflecting orientation. The seals of the damper assembly are in slide contact engagement with the rotor. The seals seal between the rotor and the damper compartment and substantially isolate the exhaust airstream from the supply airstream, in the damper compartment, when the air-deflecting member is in the first or second air-deflecting orientation.

In the first air-deflecting orientation, the air-deflecting member is positioned to deflect the exhaust airstream from the exhaust opening to the first heat-exchange opening and deflect the supply airstream from the second heat-exchange opening to the supply opening. This orientation causes the exhaust airstream to be pushed through the first heat exchanger and the supply airstream to be pulled through the second heat exchanger. In the second air-deflecting orientation, the air-deflecting member is positioned to deflect the exhaust airstream from the exhaust opening to the second heat-exchange opening and deflect the supply airstream from the first heat-exchange opening to the supply opening. This orientation causes the exhaust airstream to be pushed through the second heat exchanger and the supply airstream to be pulled through the first heat exchanger.

A method of operating a HRV is also contemplated by the present invention. The HRV transfers heat energy between an exhaust airstream and a supply airstream of a building. The HRV is of the type having first and second regenerative HEs, a damper compartment coupled to the first and second heat exchangers, and a damper assembly situated substantially within the damper compartment. The damper assembly includes a rotor mounted for rotation about an axis of rotation. The rotor has a pair of solid end walls disposed in spaced-apart relation along the axis of rotation. The pair of space-apart end walls define a substantially open, circumferential periphery surrounding the axis of rotation. The rotor also has an air-deflecting member (e.g., a damper blade) solidly connected between the pair of end walls. An exemplary method of the present invention comprises the steps of: (a) rotating the rotor about the axis of rotation to position the air-deflecting member in a first air-deflecting orientation; (b) receiving the exhaust airstream from inside the building; (c) moving the exhaust airstream into the damper compartment and in through the periphery of the rotor; (d) deflecting the exhaust airstream with the air-deflecting member, such that the exhaust airstream flows out through the periphery of the rotor, out of the damper compartment, and into the first heat exchanger: (e) exchanging heat energy between the exhaust airstream and the first heat exchanger and expelling the exhaust airstream to the outside; (f) moving the supply airstream from the outside and into the second heat exchanger; (g) exchanging heat energy between the supply airstream and the second heat exchanger to produce a first conditioned airstream; (h) moving the first conditioned airstream into the damper compartment and in through the periphery of the rotor; (i) deflecting the first conditioned airstream with the air-deflecting member, such that the first conditioned airstream flows out through the periphery of the rotor and out of the damper compartment; and (j) moving the first conditioned airstream from the damper compartment to the inside of the building.

The exemplary method continues with the further steps of: (k) rotating the rotor about the axis of rotation to position the air-deflecting member in a second air-deflecting orientation; (l) repeating steps (b) and (c) and then deflecting the exhaust airstream with the air-deflecting member, such that the exhaust airstream flows out through the periphery of the rotor, out of the damper compartment, and into the second heat exchanger; (m) exchanging heat energy between the exhaust airstream and the second heat exchanger and then expelling the exhaust airstream to the outside; (n) moving the supply airstream from the outside and into the first heat exchanger; (o) exchanging heat energy between the supply airstream and the first heat exchanger to produce a second conditioned airstream; (p) moving the second conditioned airstream into the damper compartment and in through the periphery of the rotor: (q) deflecting the second conditioned airstream with the air-deflecting member, such that the second conditioned airstream flows out through the periphery of the rotor and out of the damper compartment; (r) moving the second conditioned airstream from the damper compartment to the inside of the building; and (s) using a plurality of seals that slidably engage the rotor to seal between the rotor and the damper compartment and to substantially isolate the exhaust airstream from the conditioned airstreams, in the damper compartment, while the air-deflecting member is in the first or the second air-deflecting orientation.

BRIEF DESCRIPTION OF THE DRAWING

Further objects of the present invention will become apparent from the following description of the preferred embodiment, with reference to the accompanying drawing, in which:

FIG. 8 is a side elevation view of the rotor of the damper assembly, assembled and installed in the heat recovery ventilator, and showing a circled portion of the rotor for an enlarged view;

FIG. 8A is an enlarged view of the circled portion in FIG. 8, focusing on a seal between the rear portion of the rotor and a surrounding rotor sleeve;

FIG. 9 is a diagrammatic illustration of a seal arrangement for sealing between the front portion of the rotor and a surrounding rotor sleeve;

FIGS. 11A & 11B are companion diagrams illustrating the general operation of the heat recovery ventilator of FIG. 3.

DETAILED DESCRIPTION OF THE PREFERRED EMBODIMENT

Figure 3:
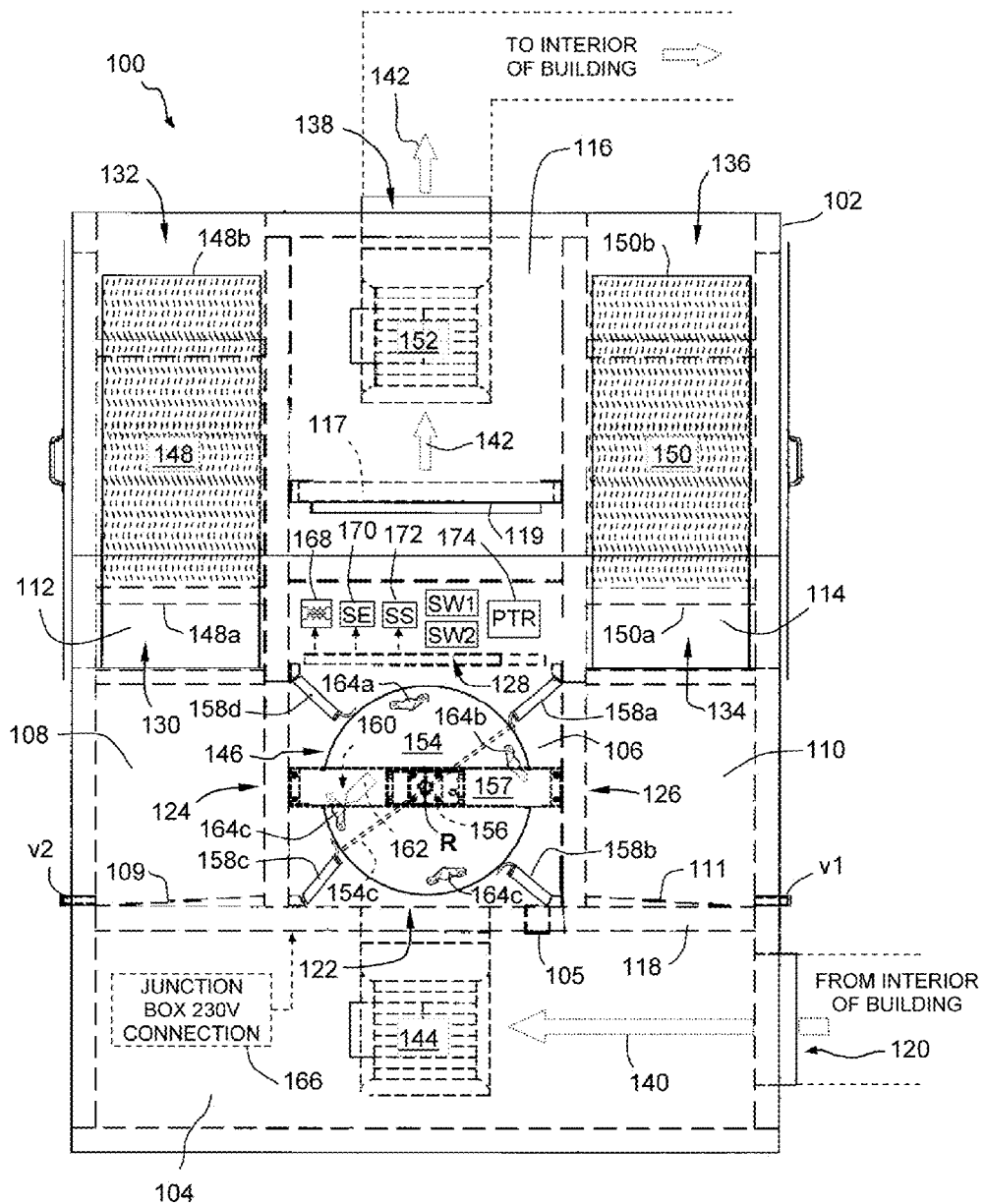
FIG. 3 is a front elevation view of a heat recovery ventilator constructed in accordance with the present invention.

Referring to FIG. 3, there is shown an exemplary embodiment of a heat recovery ventilator (HRV) 100 of the present invention. HRV 100 includes a frame 102 containing a lower compartment 104, a damper compartment 106, adjoining compartments 108 and 110, heat exchange compartments 112 and 114, and an upper compartment 116. Lower compartment 104 is separated from compartments 106, 108 and 110 by a sub-floor 118. Lower compartment 104 contains an exhaust inlet opening 120 extending through a side wall of frame 102. Damper compartment 106 contains an exhaust opening 122, first and second heat-exchange openings 124 and 126, and a supply opening 128. Exhaust opening 122 extends through sub-floor 118. Damper compartment 106 is in fluid communication with compartments 104, 108, 110, and 116 via openings 122, 124, 126, and 128, respectively. Heat exchange compartment 112 contains inside and outside openings 130 and 132, and heat exchange compartment 114 contains inside and outside openings 134 and 136. Adjoining compartment 108 is in fluid communication with heat exchange compartment 112 via inside opening 130, and adjoining compartment 110 is in fluid communication with heat exchange compartment 114 via inside opening 134. Outside openings 132 and 136 extend through a top wall (or roof) of frame 102, and are intended to be coupled to an outside environment (e.g., outside of a building). Upper compartment 116 contains a supply discharge opening 138 also extending through the top wall of frame 102. As schematically shown in FIG. 3, exhaust inlet opening 120 and supply discharge opening 138 are intended to be coupled to the interior space of a building via exhaust and supply channels, respectively, of the building's ventilation system. When so coupled, an exhaust airstream 140 from the interior of the building is received through opening 120, and a supply airstream 142 (originating from outside the building) is discharged through opening 138 to the interior of the building. A more detailed explanation of the operation of HRV 100 will be given below with reference to FIGS. 11A & 11B.

Again referring to FIG. 3, HRV 100 includes an exhaust fan 144 mounted in lower compartment 104, a damper assembly 146 mounted in damper compartment 106, a first heat exchanger (HE) 148 mounted in compartment 112, a second heat exchanger (HE) 150 mounted in compartment 114, and a supply fan 152 mounted in upper compartment 116. Damper compartment 106 is coupled to exhaust and supply fans 144 and 152 via exhaust and supply openings 122 and 128, respectively, and to HEs 148 and 150 via heat-exchange openings 124 and 126, respectively. Exhaust and supply fans 144 and 152 are direct drive blowers having suitable horsepower and capacity (e.g., CFM—cubic feet per meter) to move airstreams 140 and 142, respectively, between HRV 100 and a building's interior. For example, both exhaust and supply fans may be a ½ horsepower G9-DD direct drive blower supplied by Delhi Industries, Inc., Delhi, Ontario. Exhaust fan 144 draws exhaust airstream 140 from the building interior, through inlet opening 120, and into compartment 104. It then blows the airstream through exhaust opening 122 and into damper compartment 106. Supply fan 152 draws supply airstream 142 from damper compartment 106, through supply opening 128, and into upper compartment 116. It then blows the airstream through supply discharge opening 138 and into the building interior. Heat exchangers (HEs) 148 and 150 may be any air-to-air regenerative heat exchange units, suitable for a particular application. For example, the heat exchangers disclosed in U.S. Pat. Nos. 6,450,244 and 7,334,632 are suitable for many applications. U.S. Pat. Nos. 6,450,244 and 7,334,632 are incorporated herein by reference. HE 148 has an inside end 148a and an outside end 148b, and HE 150 has an inside end 150a and an outside end 150b. Airstreams 140 and 142 pass through HE 148 (in alternate periods) between inside and outside ends 148a, 148b, and pass through HE 150 (in alternate periods) between inside and outside ends 150a, 150b.

Figure 4:
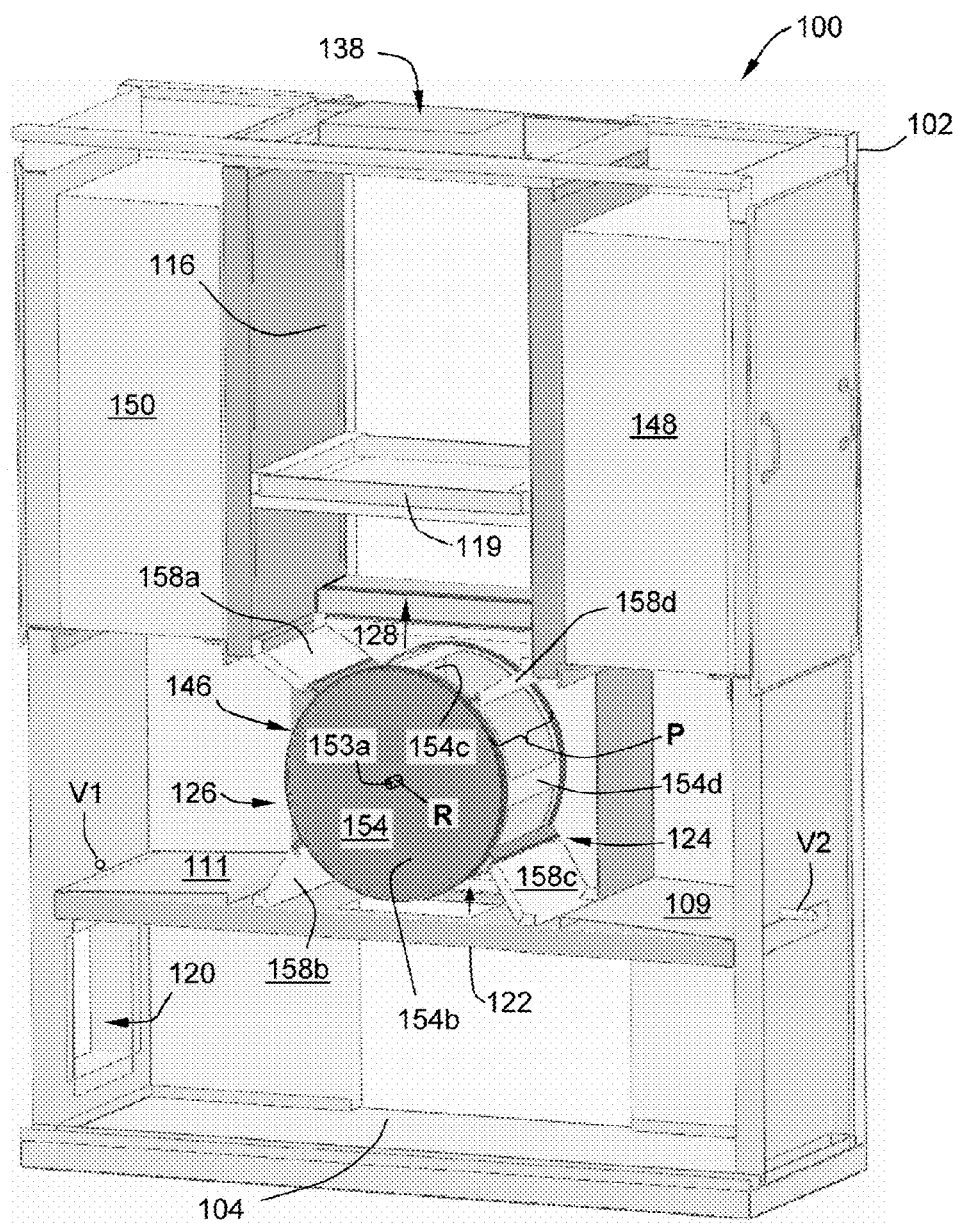
FIG. 4 is a rear perspective view of the heat recovery ventilator of FIG. 3, with certain exterior wall panels and internal components removed, to focus on a damper assembly constructed in accordance with the present invention.
Figure 5:
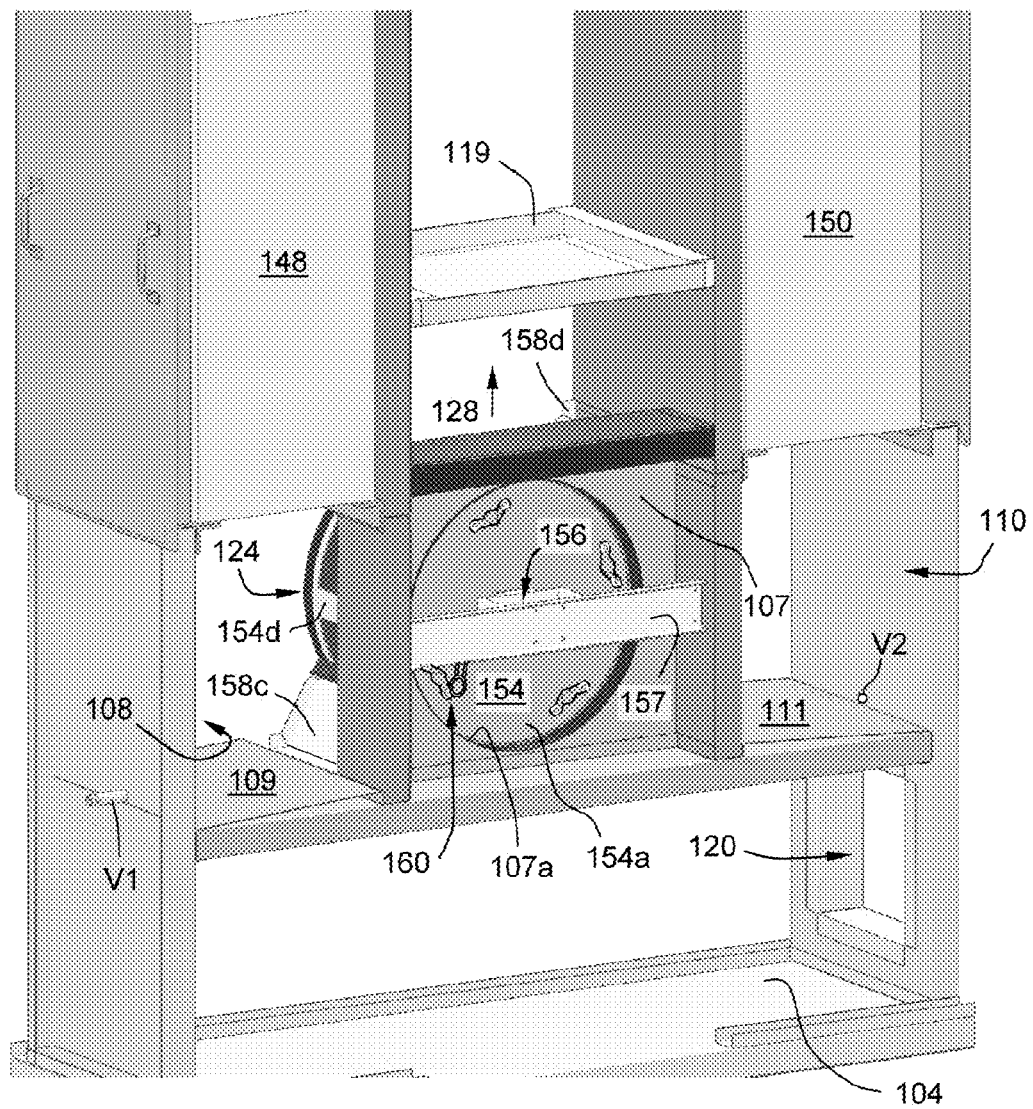
FIG. 5 is a front perspective view of the heat recovery ventilator of FIG. 3, again with certain exterior wall panels and internal components removed, to focus on the damper assembly.

The description now continues with reference to FIGS. 3, 4 & 5. FIGS. 4 & 5 depict HRV 100 in perspective views. FIG. 4 is a rear perspective of HRV 100, with certain exterior wall panels removed, and with fans 144 and 152 removed. FIG. 5 is a front perspective of HRV 100, again with certain exterior wall panels removed, and with fans 144 and 152 removed. Damper assembly 146 is mounted substantially within damper compartment 106. The purpose of damper assembly 146 is to switch oppositely flowing airstreams 140 and 142 between HEs 148 and 150. Damper assembly 146 includes a rotor 154, an electric motor unit 156, four sealing members 158a, 158b, 158c, and 158d, and a rotor position sensing system 160. Rotor 154 is cylindrical in shape and is mounted for rotation about an axis of rotation R. Rotor 154 includes front and rear circular rotor plates 154a and 154b, a damper blade 154c between the plates, and a cylindrical rotor frame 154d, within which the plates and damper blade are solidly mounted (FIGS. 4 & 5). Blade 154c is symmetrically positioned at axis R and along the diameter of rotor 154, as a preferred arrangement. Motor unit 156 is mounted outside of damper compartment 106 on a bracket 157 (FIGS. 3 & 5). Bracket 157 extends across and is outside of damper compartment 106. Motor unit 156 is mechanically coupled (e.g., bolted) to front rotor plate 154a (FIGS. 5 & 6), and motor unit 156 serves as the drive system for rotor 154. Motor unit 156 rotates rotor 154 about axis R, to position damper blade 154c in at least two air-deflecting orientations to effectuate the switch in airstreams between HEs 148 and 150. In at least one application, motor unit 156 may be a gear-driven version of a Model T63 Rotator supplied by SEMCO Motion Products/Larsen Manufacturing Co., Mountain Green, Utah, which is rated for loads up to 100 lbs, has a high turning torque, and has a speed from 0.5 to 6 RPM.

As shown in FIGS. 3 & 4, sealing members 158a-158d are each in slide contact engagement with rotor 154, along a substantially open, circumferential periphery P (FIG. 4) of rotor 154. In the embodiment shown in FIG. 4, periphery P is substantially defined by rotor plates 154a, 154b and rotor frame 154d. As best shown in FIG. 4, periphery P is substantially aligned and in fluid communication with exhaust and supply openings 122 and 128 and with heat-exchange openings 124 and 126. Sealing members 158a-158d seal against air freely circulating around rotor 154 in damper compartment 106. Sealing members 158a-158d substantially isolate exhaust airstream 140 from supply airstream 142, as both airstreams flow through compartment 106 and when damper blade 154c is in one of at least two air-deflecting orientations (FIGS. 11A & 11B). Specifically, sealing members 158a and 158d flank supply opening 128 and prevent supply airstream 142 from circulating around compartment 106, except to flow from rotor 154 to supply opening 128. Sealing members 158b and 158c flank exhaust opening 122 and prevent exhaust airstream 140 from circulating around compartment 106, except to flow from exhaust opening 122 into rotor 154. Sealing members 158b and 158a flank HE opening 126 and prevent either exhaust or supply airstreams 140, 142 from circulating around compartment 106, except to flow between opening 126 and the interior of rotor 154. Lastly, sealing members 158d and 158c flank HE opening 124 and prevent either exhaust or supply airstreams 140, 142 from circulating around compartment 106, except to flow between opening 124 and the interior of rotor 154. Further details of construction of sealing members 158a-158d are given below with reference to FIG. 6.

Rotor position sensing system 160 may be implemented using any known rotary position sensing scheme. In FIG. 3, system 160 is represented by a sensor 162, which can be an electrically inductive sensor that senses the proximity of four raised metal brackets 164a, 164b, 164c and 164d, one at a time as rotor 154 is rotated. Brackets 164a-164d are attached (e.g., by sheet metal screws) to front rotor plate 154a, as shown in FIGS. 3 and 5. They are evenly spaced 90-degrees around plate 154a, and their positions relative to damper blade 154c are set such that blade 154c is in an air-deflecting orientation when the proximity of one of the brackets 164a-164d is sensed. Alternatively, sensor 162 can be a switch that is actuated by an actuator wheel as it rides up each raised bracket 164a-164d. A further description of sensing system 160 is given below with reference to FIG. 7.

Again referring to FIGS. 3 & 4, inclined condensate drip pans 109 and 111 are installed in adjoining compartments 108 and 110, respectively. Pans 109, 111 catch condensation dripping from HEs 148, 150 and drain it out the sides of HRV 100 through vents v1 and v2. An electrical metallic tubing (EMT) conduit 105 extends through sub-floor 118, for providing a passageway for wiring. In upper compartment 116, between supply opening 128 and supply fan 152, there is a MERV pre-filter 117 supported in an open metal frame or track 119. HRV 100 includes a junction box 166 to run electrical power from a building to HRV 100. In this embodiment, HRV 100 receives single phase, 230 volts, 60 Hz electrical power. This power is fed to a power transformer 168 and to exhaust and supply fan starter units 170 and 172, all of which are mounted on a front panel of HRV 100 (FIG. 3). Transformer 168 steps down the power to single phase, 115 volts, 60 Hz electrical power, which is used to power motor unit 156 and a programmable timing relay (PTR) unit 174 (FIG. 3). PTR unit 174 is used to control the operation of motor unit 156 and thus rotor 154. Manual switches SW1 is used to start a programmed operation of motor unit 156 and rotor 154, and SW2 is used to turn on fans 144 and 152. A further explanation of the electrical circuitry and components are provided below with reference to FIG. 10.

It should be understood that frame 102 of HRV 100 is enclosed by exterior wall panels and a pair of side doors (see doors in FIGS. 3-5), and the wall panels are insulated with a layer of fiberglass insulation. This type of enclosure is well known in the industry. Damper assembly 146 and damper compartment 106 are partially enclosed at the front of HRV 100 by a front damper wall 107 (see FIG. 5). Wall 107 contains a circular opening 107a. Opening 107a exposes front plate 154a of rotor 154 to allow for direct coupling of motor unit 156 to rotor 154, direct coupling of position sensing system 160 to rotor 154, and unobstructed operation of motor unit 156 and system 160 relative to rotor 154. Opening 107a also allows a maintenance person to observe the operation of the rotor. Optionally, an exterior panel may enclose wall 107, front rotor plate 154a, motor unit 156, and bracket 157. Damper assembly 146 and damper compartment 106 are enclosed at the rear of HRV 100 (FIG. 4) by an exterior rear wall panel (not shown in FIGS. 3-5). A bushing (of a plain or journal bearing) is attached to this rear wall panel and is positioned, configured and dimensioned to receive a pin 153a (FIG. 4). Pin 153a is welded or otherwise attached to rear rotor plate 154b (FIG. 4). The bushing and pin combination constitutes a plain or journal bearing, which supports rotor 154 for 360-degree rotational motion (see also FIG. 6).

Figure 6:
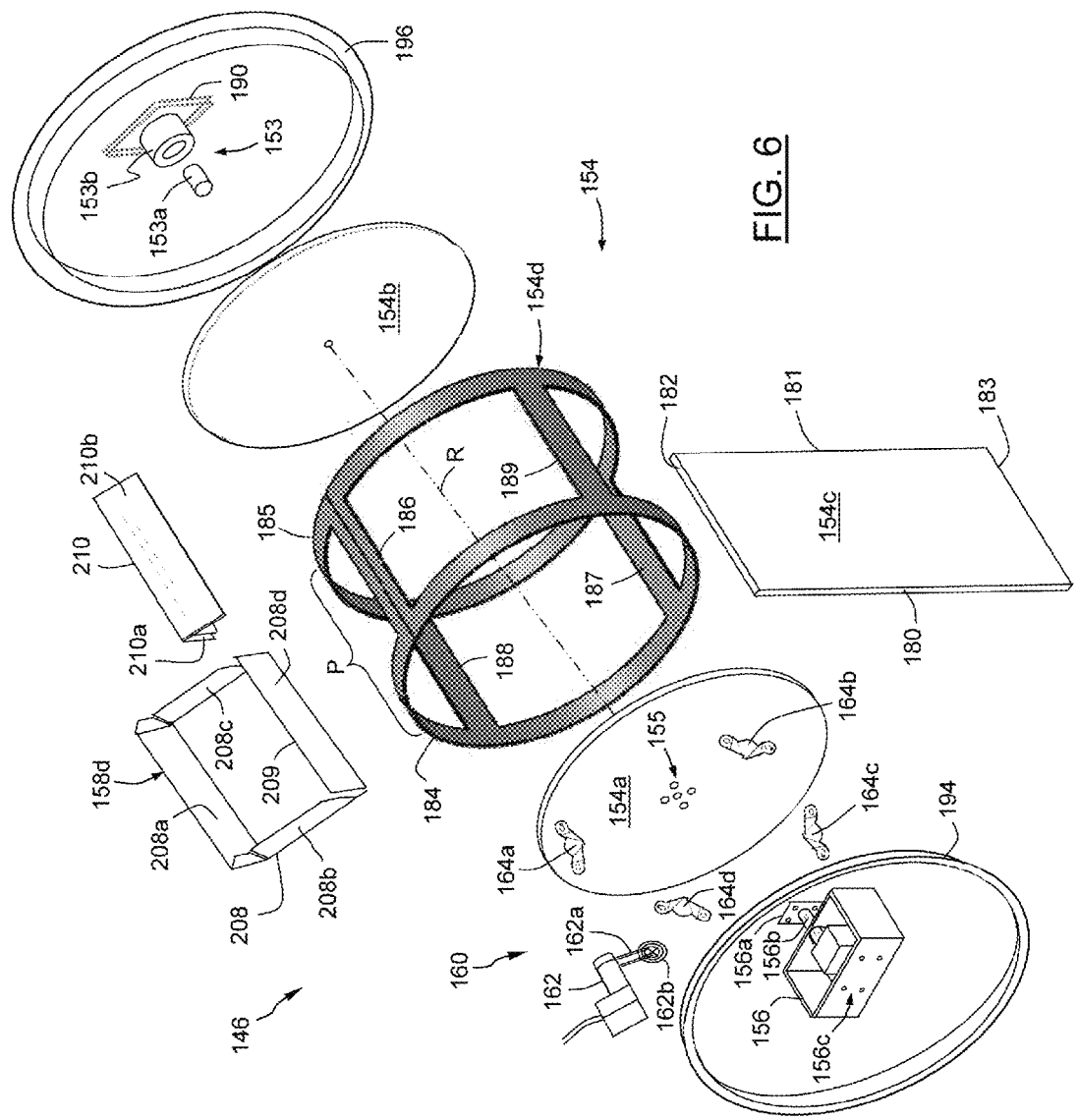
FIG. 6 is an exploded view of the damper assembly of FIGS. 4 and 5.

Referring now to FIG. 6, there is shown an exploded view of damper assembly 146. Again, rotor 154 includes front rotor plate 154a, rear rotor plate 154b, damper blade 154c, and rotor frame 154d. As shown, rotor plates 154a and 154b are solid circular-shaped plates or, more generally, end walls. Damper blade 154c is a flat, solid rectangular plate, which functions to deflect airstreams 140 and 142. More generally, blade 154c is an air-deflecting member, which may have another suitable shape and/or contour. Blade 154c has four sides 180-183. Rotor frame 154d is cylindrically-shaped. It comprises a pair of circular rims 184 and 185 fixed in spaced-apart relation by four equally spaced cross members 186-189. Preferably, font and rear plates 154a, 154b, damper blade 154c, and rotor frame 154d are made of 0.125 inch thick mill finished aluminum. Rotor plates 154a and 154b are solidly connected to sides 180 and 181 of blade 154c, respectively. The term "solidly connected" means an air-tight or sealed connection between two parts. A welded connection is one example. As understood from FIG. 6 (and shown in FIG. 8), plates 154a and 154b are spaced apart from each other, along axis of rotation R, by the width of blade 154c, and both generally define a substantially open, circumferential periphery P (see FIG. 8). Plates 154a. 154b are each centered along axis R (i.e., the midpoint of their diameters are at axis R). Sides 180, 181 are connected to plates 154a, 154b, respectively, along the diameters of the respective plates, such that when rotor 154 is rotated, blade 154c will rotate about axis R. Sides 182 and 183 of damper blade 154c are solidly connected (e.g., welded) to cross members 186 and 187, respectively, within rotor frame 154d. Plates 154a, 154b are solidly connected (e.g., welded) to rims 184, 185, respectively, within rotor frame 154d. Preferably, plates 154a, 154b are set inside rims 184, 185 by about 0.125 inches from the outward facing edges of the rims. If rotor 154 includes rotor frame 154d, circumferential periphery P is further defined by rims 184, 185 and cross-members 186-189.

As shown in FIG. 6, front rotor plate 154a contains a bolt-hole pattern 155 of four equally-spaced thru holes, for receiving bolts to mount motor unit 156 to rotor 154. As shown, motor unit 156 includes a mounting plate 156a with a bolt-hole pattern matching pattern 155. Mounting plate 156a is fixed at the end of a rotating shaft 156b of motor unit 156. Bolts (not shown) secure mounting plate 156a (and thus motor unit 156) to rotor 154. On the back side of motor unit 156 is a bolt-hole pattern 156c for mounting the motor unit to bracket 157 (see, e.g., FIG. 5). Motor unit 156 (attached to bracket 157) supports the front side of rotor 154, for rotational motion. When motor unit 156 is energized, shaft 156b rotates, causing mounting plate 156a and rotor 154 to rotate about axis R. Motor unit 156 is very quiet during operation under the load of rotor 154. As mentioned above, motor unit 156 may be a gear-driven version of a Model T63 Rotator supplied by Semco Motion Products/Larsen Mfg. Co., Mountain Green, Utah. A plain (or journal) bearing 153 (FIG. 6) supports the rear side of rotor 154, for rotational motion about axis R. Bearing 153 includes pin 153a (previously introduced in FIG. 4) and a bushing 153b. Pin 153a is welded or otherwise attached to the center of rear rotor plate 154b (on axis R). Bushing 153b is attached to an interior surface of a rear wall panel 190 (a fragment of wall 190 is only shown in FIG. 6). Bearing 153 may, alternatively, be a tilt-pad bearing. Bearing 153 may be lubricated with any suitable grease, such as a lithium-based grade #2 grease.

Again referring to FIG. 6, front and rear rotor sleeves 192 and 194 serve as a dynamic interface between compartment 106 and rotor 154. Front sleeve 194 is circular in shape and is sized to fit tightly in opening 107a of front damper wall 107 (FIG. 5). Sleeve 194 is solidly connected to wall 107 at a mounting flange of sleeve 194 (see detail in FIG. 9). Rear sleeve 196 is solidly connected to the interior surface of rear panel wall 190 at a mounting flange of sleeve 196. Sleeves 194 and 196 are shown with mounting flanges; however, the flanges may be dispensed with, in which case an edge of each sleeve is directly welded to the appropriate wall. Sleeves 194 and 196 are slightly larger in diameter (e.g., 0.125 inches) than rotor frame 154d and, upon assembly, are coaxial with rims 184 and 185, respectively (see FIG. 8). Sleeves 194, 196 provide an interface between the rotating rotor 154 and two opposing walls of damper compartment 106 (i.e., wall 107 and wall 190). This interface defines a space or gap between each sleeve and rotor 154 (see FIGS. 8, 8A & 9 and accompanying description). Sleeves 194 and 196 are considered to be, collectively, an outer frame of damper assembly 146. In a modification to the illustrated embodiment, sleeves 194, 196 are joined together by four cross-members, in a similar fashion to rotor frame 154d, to form a unitary outer frame encircling rotor 154. The cross-members of the outer frame are equally spaced around the frame such that they align with the cross-members of rotor frame 154d when damper blade 154c is in one of the air-deflecting orientations. Therefore, the outer frame would not obstruct air flow between rotor 154 and damper compartment openings 122, 124, 126, and 128.

Figure 1:
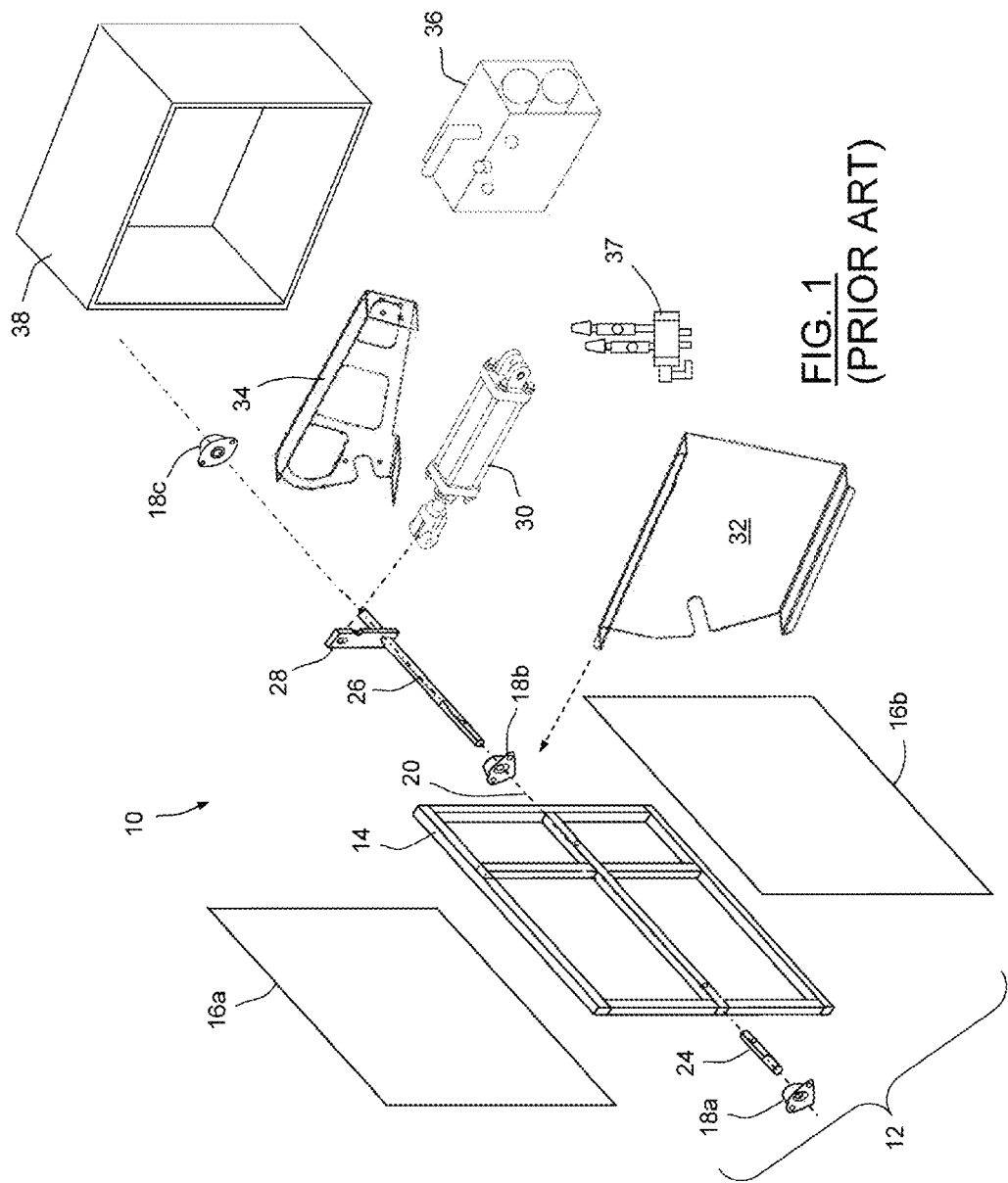
FIG. 1 (Prior Art) is an exploded view of a prior art damper assembly including a damper, three bearings, upper and lower drive shafts, pneumatic drive system components, and a support structure for the drive system.
Figure 2:
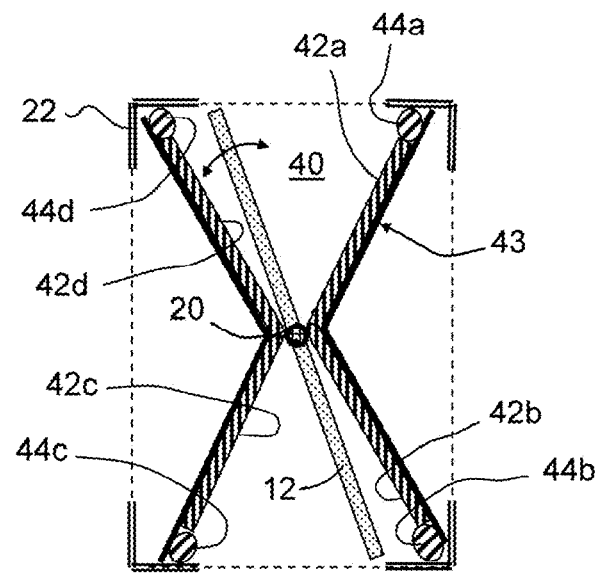
FIG. 2 (Prior Art) is a schematic diagram illustrating the prior art damper of FIG. 1, in cross-section, and illustrating an arrangement of damper seals relative to the damper.
Figure 7:
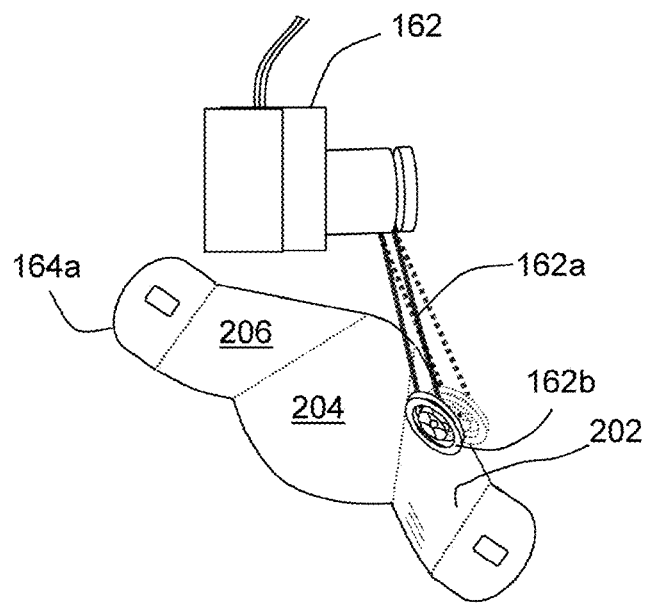
FIG. 7 is a diagrammatic illustration of a position sensing system for sensing the rotational position of a rotor of the damper assembly.

With further reference to FIG. 6, position sensing system 160 includes sensor 162 and proximity brackets 164a-164d. Sensor 162 is preferably a limit switch actuated by an actuator arm 162a and an actuator wheel 162b (see also FIG. 7). A suitable limit switch for sensor 162 is supplied by AutomationDirect, Cumming, Ga., under model number ABP1H51Z11. As indicated above, proximity brackets 164a-164d are mounted to front rotor plate 154a with sheet-metal screws. They are placed near the perimeter of plate 154a and spaced about 90 degrees apart. The brackets are oriented on plate 154a, relative to damper blade 154c, such that when wheel 162b engages one of the brackets, damper blade 154c is in one of the air-deflecting orientations. As best shown in FIG. 7, wheel 162b engages. e.g., proximity bracket 164a as rotor 154 rotates about axis R. Proximity bracket 164a has a leading incline segment 202, a flat top segment 204, and a trailing incline segment 206. Wheel 162b rolls up leading incline segment 202, causing actuator arm 162a to be forced back (dotted line). The backward motion of arm 162a causes the mechanical switch of sensor 162 to be actuated (either opened or closed depending on the implementation of the control circuitry). In proper operation, when the switch is actuated, power to motor unit 156 is shut off and rotor 154 comes to a stop. Wheel 162b reaches top segment 204 as rotor 154 stops. Pursuant to a programmable timer relay unit (e.g., PTR 174 in FIGS. 3 & 10), rotor 154 remains still during a ventilation period (e.g., 70 seconds), after which motor unit 156 is re-energized to restart rotation of rotor 154. As the rotation of rotor 154 resumes, wheel 162b rolls off top segment 204 and rolls down trailing incline segment 206 (FIG. 7). As wheel 162b rolls down segment 206, actuator arm 162a springs back to its original position and the switch of sensor 162 returns to its original state, ready to be actuated again by the next proximity bracket (e.g., 164b). As mentioned, sensor 162 could be an electrical induction sensor that merely senses the proximity of each bracket 164a-164d, as it approaches sensor 162.

Again referring to FIG. 6, sealing member 158d is shown as representative of the four sealing members 158a-158d of damper assembly 146. They are identical. Each sealing member includes a seal plate 208 and an edge seal 210. Seal plate 208 is cutout from a single sheet of 16 gauge galvanized steel. It is cut and folded to form three attachment sides 208a-208c and a free edge side 208d. Attachment sides 208a-208c are attached by tack-weld or weld to the interior structures of damper compartment 106, as best shown in FIGS. 3 & 4. Sides 208a of sealing members 158a and 158d are attached to opposing walls, respectively, that extend into supply compartment 116 (see FIG. 4). Sides 208a of sealing members 158b and 158c are attached to sub-floor 118 (see FIGS. 3 & 4). For sealing members 158d and 158c, side 208b is attached to front wall 107 and side 208c is attached to rear wall 190. For sealing members 158a and 158b, side 208b is attached to rear wall 190 and side 208c is attached to front wall 107. When installed, free edge side 208d of each sealing member is positioned toward and across open periphery P of rotor 154. Free edge side 208d has a free edge 209. Edge seal 210 has a resilient or deforming grip portion 210a and a sealing wiper portion 210b. Grip portion 210a tightly fits onto free edge 209 to secure edge seal 210 to seal plate 208. Grip portion 210a may contain a metal lining or clips that are crimped or pinched to secure the grip portion to free edge side 208d. When each sealing member is installed, wiper portion 210b is in forced contact with rotor 154. Wiper portion 210b extends across periphery P of rotor 154. As rotor 154 rotates, wiper portion 210b slides over rims 183, 185 and over cross-members 186-189, in a tight sealing engagement with these parts. Wiper portion 210b may also extend over and make sealing contact with front and rear rotor sleeves 194, 196. When rotor 154 stops its rotation, and rotor blade 154c is in an air-deflecting orientation (FIGS. 11A & 11B), wiper portion 210b of each sealing member is in sealing contact with one of the cross-members 186-189 of rotor frame 154d. This ensures that exhaust airstream 140, flowing between exhaust opening 122 and one of the heat-exchange openings (124, 126), is substantially isolated from supply airstream 142, flowing between the other of the heat-exchange opening (124, 126) and supply opening 128. Edge seal 210 may be a Model 1120A866 edge grip seal supplied by McMaster-Carr, Aurora, Ohio.

FIG. 8 shows a side elevation of assembled rotor 154, including rotor plates 154a, 154b, rotor blade 154c, and rotor frame 154d. Cross-members 186, 187 and 189 and rims 184 and 185 of frame 154d are also shown. As shown, rims 184 and 185 are coaxial with rotor sleeves 194 and 196, respectively. Sleeves 194, 196 only partially cover rims 184, 185, as shown. An area A is circled in FIG. 8 to define an enlarged view shown in FIG. 8A. FIG. 8A focuses on the interface between rotor 154 and sleeve 196, and shows a seal 212 between the rotor and sleeve. In FIG. 8A, a portion of rotor frame 154d is shown with rim 185 and cross-member 186. Mounted within rim 185, and offset from the rim's edge by 0.125 inches, is rear rotor plate 154b. Seal 212 is a felt seal with an adhesive back. It is adhered to the inside surface of sleeve 196, all the way around sleeve 196. Seal 212 is made thick enough to fill the gap between rotor 154 and sleeve 196, but is not oversized to cause any significant friction on the rotating rotor 154 or excessive wear on the seal. Seal 212 is 0.125 inches thick to match the dimension of the annular space or gap between rotor 154 and sleeve 196. Seal 212 substantially blocks airflow between rotor 154 and sleeve 196. Air from rotor 154 is substantially prevented from passing between rotor 154 and sleeve 196 and infiltrating other area of damper compartment 106. Seal 212 may be fashioned from Model 8766K322 soft gray F7 felt sheeting, supplied by McMaster-Carr, Aurora, Ohio.

Referring to FIG. 9, a seal 214 is shown at the front of rotor 154. Note, the view in FIG. 9 is rotated 90 degrees from the frame of reference in FIG. 8. In FIG. 9, a part of rim 184 of rotor frame 154*d* is shown. Mounted within rim 184, and offset from the rim's edge by 0.125 inches, is front rotor plate 154*a*. As shown, rotor sleeve 194 extends over a portion of rim 184 and is coaxial with rim 184. FIG. 9 shows sleeve 194 inserted through opening 107*a* of front wall 107 and attached to wall 107 by its flange. Seal 214 extends completely around the inside surface of sleeve 194 and seals all around rotor 154. Seal 214 includes a metal mounting angle 214*a* and a flap seal 214*b*. Angle 214*a* extends completely around the inside surface of sleeve 194 and is tightly fastened to the sleeve by a number of sheet-metal screws 215. Flap seal 214*b* includes a grip portion G and a flap portion F, both of which extend 360 degrees around the perimeter of front rotor plate 154*a*. Grip portion G fits onto angle 214*a*, as shown, and is crimped or pinched tight for a secure sealed attachment. Flap portion F is preferably an EPDM sponge rubber flap. Flap portion F is deflected by rotor plate 154*a*, which causes portion F to be resiliently urged against plate 154*a*. This arrangement establishes a dynamic air-tight seal against the rotating plate 154*a*. Thus, seal 214 substantially prevents air from passing between sleeve 194 and rotor 154 (i.e., rim 184) and escaping damper compartment 106. Flap seal 214*b* may be a Model 5B150B3X1/16A Flap Seal supplied by Trim-Lok, Inc., Buena Park, Calif.

Figure 10:
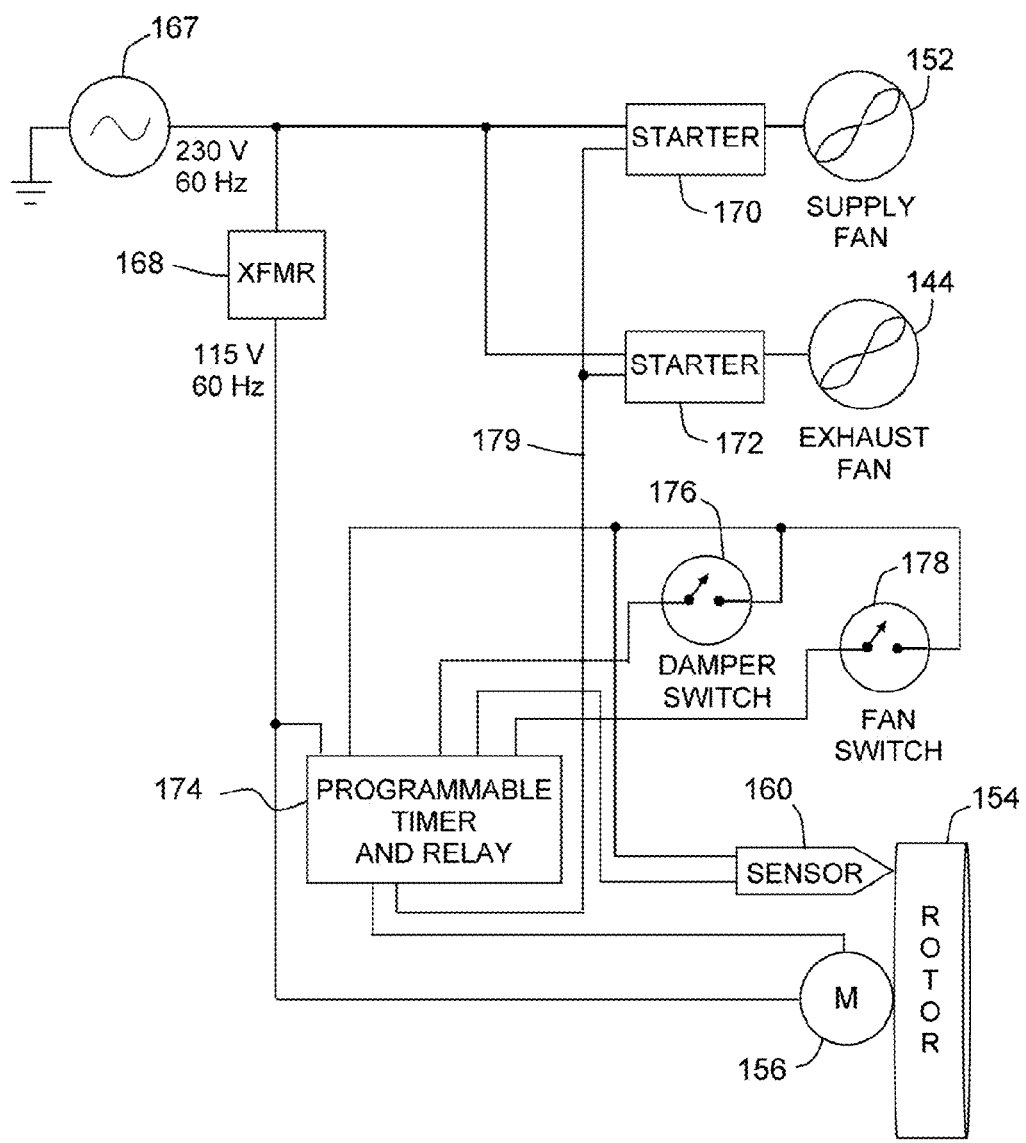
FIG. 10 is a generalized schematic of the electrical wiring and control system of the heat recovery ventilator of the present invention.

Referring to FIG. 10, there is shown a generalized schematic of the electrical wiring and control system of HRV 100. Electrical power from the building in which HRV 100 is to be installed is connected to HRV 100 via junction box 166 (FIG. 3). In this embodiment, the power is single phase, 60 Hz, 230 volts. In FIG. 10, power from the building is represented as a power source 167. The electrical power is distributed to transformer 168, supply fan starter 170, and exhaust fan starter 172. Transformer 168 steps down the voltage to 115 volts and the 115 volts is applied to programmable timing relay (or PTR) 174 and motor unit 156. The electrical circuit that powers motor unit 156 is opened and closed by PTR 174 under an operational sequence pre-programmed in PTR 174. PTR 174 may be a TECO SG2 10HR-A Programmable Logic Relay supplied by B&B Electronics Mfg. Co., Ottawa, Ill. A manual damper switch 176 (SW1 in FIG. 3) is connected across an input of PTR 174 and, when closed, triggers the operational sequence in PTR 174, wherein motor unit 156 is energized and rotor 154 begins to rotate under the control of PTR 174 and position sensing system 160. Rotor 154 continues to rotate until sensing system 160 senses that the damper blade (154*c*) of rotor 154 is in one of the air-deflecting orientations. As previously described, this is done by using four proximity brackets on rotor 154 and a mechanical switch actuated by the brackets (see, e.g., FIGS. 6 & 7). The brackets are so arranged on rotor 154 that the damper blade will be in an air-deflecting orientation when a bracket actuates the switch. Again referring to FIG. 10, sensing system 160 is connected across another input of PTR 174. When the switch in system 160 is closed upon sensing that the damper blade is in an air-deflecting orientation, PTR 174 is signaled to open the circuit across motor unit 156 ("motor circuit"). This de-energizes the motor unit and causes rotor 154 to stop rotating. PTR 174 then times a pre-programmed ventilation period, during which rotor 154 remains still. As an example, the ventilation period may be 70 seconds. At the conclusion of the ventilation period, PTR 174 closes the motor circuit and motor unit 156 is re-energized and rotor 154 begins to rotate again. Rotor 154 continues to rotate until sensing system 160 again senses that the damper blade is in an air-deflecting position. A manual fan switch 178 (SW2 in FIG. 3) is also connected across an input of PTR 174 and, when closed, signals PTR 174 to start both exhaust and supply fans 144, 152, via a connection 179. Fans 144 and 152 continue to run until switch 178 is opened. In this embodiment, PTR 174 causes motor unit 156 to rotate in one direction (e.g., counter-clockwise). Thus, rotor 154 will rotate 360 degrees in four steps or quarter turns and after completing four ventilation periods.

Referring to FIGS. 11A and 11B, the general operation of HRV 100 will now be described. The operation is described for the case of cold weather months. However, the operation is essentially the same for the case of warm weather months. In this example, HRV 100 is installed inside a building that encloses an interior space from the outside climate. Referring to FIG. 11A, damper blade 154*c* is positioned to a first air-deflecting orientation by the control and sensing systems of FIG. 10. Exhaust fan 144 draws a warm exhaust airstream 140 from the building's interior, via the building's ventilation exhaust channel or air duct. Airstream 140 is blown into damper compartment 106, through exhaust opening 122, and is deflected by damper blade 154*c*. Airstream 140 is deflected out of compartment 106, through opening 124, and enters HE 148. As airstream 140 flows through HE 148, the sensible and latent heat energy is transferred from airstream 140 to the storage mass or matrix contained in HE 148 ("hot period"). Airstream 140 then exits HE 148 and is exhausted to the outside of the building directly through a first vent or a first air duct and first vent (not shown). At the same time exhaust airstream 140 is flowing through HRV 100, supply fan 152 draws a cool supply airstream 142 from outside the building, through a second vent or second vent and air duct (not shown). Airstream 142 is drawn into HE 150, which has been warmed by exhaust airstream 140 in a previous hot period. The heat energy stored in HE 150 is transferred to airstream 142 as it flows through the storage mass or matrix of HE 150 ("cold period"). Thus, airstream 142 is warmed and HE 150 is cooled. Warmed (or conditioned) airstream 142 is then drawn into damper compartment 106, through opening 126. Warmed airstream 142 is then deflected by damper blade 154*c* and drawn out of compartment 106, through supply opening 128. Supply fan 152 then blows warmed or conditioned airstream 142 out of HRV 100 and into the building's interior via the building's ventilation supply channel or air duct. The term "conditioned airstream," as it refers to a supply airstream, means an airstream that has been either warmed or cooled by a heat exchanger. The term "heat energy" means both sensible and latent heat energy.

Referring to FIG. 11B, after a 70-second ventilation period, damper blade 154*c* is advanced a quarter-turn or about 90 degrees counter-clockwise from its position in FIG. 11A, under operation of the control and sensing systems. In this new position (FIG. 11B), damper blade 154*c* is in a second air-deflecting orientation. In this embodiment, there are two air-deflecting orientations, and they are shown in FIGS. 11A & 11B. In the second air-deflecting orientation (FIG. 11B), exhaust fan 144 again draws warm exhaust airstream 140 from the building's interior and blows it into damper compartment 106, through opening 122. Airstream 140 is deflected by damper blade 154c and flows out of compartment 106, through opening 126. Airstream 140 then enters previously cooled HE 150. As airstream 140 flows through HE 150, the sensible and latent heat energy is transferred from airstream 140 to the storage mass or matrix of HE 150 (hot period). Airstream 140 then exits HE 150 and is exhausted to the outside of the building through the second vent or second air duct and second vent (not shown). At the same time, supply fan 152 draws a cool supply airstream 142 from outside the building, through the first vent or first vent and first air duct (not shown). Airstream 142 is drawn into HE 148, which was warmed by airstream 140 in the previous period. The heat energy stored in HE 148 is transferred to airstream 142 as it flows through HE 148 (cold period). Warmed (or conditioned) airstream 142 is then drawn into damper compartment 106, through opening 124. Warmed airstream 142 is then deflected by damper blade 154c and drawn out of compartment 106, through supply opening 128. Supply fan 152 then blows warmed or conditioned airstream 142 out of HRV 100 and into the building's interior, as in the previous ventilation period.

Again, the operation of HRV 100 in warm weather months is essentially the same as described above, except airstream 140 is cool (due to building air-conditioning cooling) and supply airstream is warm due to the warm outside climate. In the warm weather case, HEs 148, 150 are cooled by the exhaust airstream and warmed by the supply airstream. Thus, the warm supply airstream is cooled by HEs 148, 150 before entering the interior of the building.

Operating through both a hot and a cold period of operation is considered one cycle of operation in a single air-to-air regenerative heat exchanger. Heat (sensible and/or latent) is transferred between exhaust and supply airstreams during one cycle of operation, or after every other period of operation. Thus, at least two heat exchangers are employed, in conjunction with rotating damper assembly 146, to provide an exchange of heat energy between exhaust and supply airstreams during each period of operation.

In the preferred embodiment, blade 154c moves in one direction through four equally-spaced rotor positions over 360 degrees, which puts the blade in one of the two air-deflecting orientations (as shown in FIGS. 11A & 11B). The control system of FIG. 10, including PTR 174, is programmed to operate rotor 154 in this manner. As understood from the above description, damper blade 154c moves through four rotor positions in four steps, with each step requiring 90 degrees of rotation of rotor 154. If each rotor position is defined by an hour on a clock face, a first position can be defined as 10 o'clock (follow along in FIG. 11A), a second position as 8 o'clock, a third position as 4 o'clock, and a fourth position as 2 o'clock. Thus, damper blade 154c is in the first air-deflecting orientation (FIG. 11A) when rotor 154 is in the first (10 o'clock) and third (4 o'clock) positions and in the second air-deflecting orientation when the rotor is in the second (8 o'clock) and fourth (2 o'clock) rotor positions. It is to be understood that the present invention is not limited to this manner of operation. In an alternative embodiment, PTR 174 can be programmed to move rotor 154 in a reciprocating manner between two adjacent rotor positions, to place rotor blade 154c in the first and the second air-deflecting orientations.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What I claim is:

1. A heat recovery ventilator for transferring heat energy between an exhaust airstream and a supply airstream of a building that encloses an inside from an outside, the exhaust airstream being received from the inside of the building via an exhaust channel and the supply airstream being delivered to the inside of the building via a supply channel, said heat recovery ventilator comprising:

first and second regenerative heat exchangers, each having an outside end coupled to the outside and an inside end, each of said heat exchangers allowing air to pass therethrough between the inside and the outside ends;

a damper compartment containing an exhaust opening, a supply opening, and first and second heat-exchange openings, said compartment being coupled to the inside ends of said first and said second heat exchangers via the first and the second heat-exchange openings, respectively, and said compartment being coupleable to the exhaust channel and the supply channel of the building via the exhaust and the supply openings, respectively, such that said compartment is coupled to the exhaust and the supply channels, and during operation of said heat recovery ventilator, the exhaust airstream enters said damper compartment through the exhaust opening and the supply airstream exits said damper compartment through the supply opening; and a damper assembly, situated substantially within said damper compartment, including:

(i) a rotor, mounted for rotation about an axis of rotation, having— first and second solid end walls disposed in spaced-apart relation along the axis of rotation to define a substantially open, circumferential periphery surrounding the axis of rotation, the periphery being substantially aligned and in fluid communication with the exhaust and the supply openings and with the first and the second heat-exchange openings of said damper compartment, and an air-deflecting member, solidly connected between the first and the second end walls;

(ii) drive means, coupled to the rotor, for rotating the rotor about the axis of rotation and positioning the air-deflecting member in a first air-deflecting orientation and in a second air-deflecting orientation, in the first orientation, the air-deflecting member being positioned to deflect the exhaust airstream from the exhaust opening to the first heat-exchange opening and deflect the supply airstream from the second heat-exchange opening to the supply opening, such that the exhaust airstream is pushed through the first heat exchanger and the supply airstream is pulled through the second heat exchanger, in the second orientation, the air-deflecting member being positioned to deflect the exhaust airstream from the exhaust opening to the second heat-exchange opening and deflect the supply airstream from the first heat-exchange opening to the supply opening, such that the exhaust airstream is pushed through the second heat exchanger and the supply airstream is pulled through the first heat exchanger; and (iii) sealing means, in slide contact engagement with the rotor, for sealing between the rotor and said damper compartment and for substantially isolating the exhaust airstream from the supply airstream in said damper compartment while the air-deflecting member is in the first or the second air-deflecting orientation.

2. The heat recovery ventilator of claim 1, wherein the rotor of said damper assembly further includes a substantially cylindrical rotor frame having first and second substantially circular rims fixed in spaced-apart relation by first and second cross members, the substantially open, circumferential periphery of the rotor being further defined by the first and the second rims and the first and the second cross members of the rotor frame, the first and the second end walls of the rotor being substantially circular in shape and mounted within the first and the second rims of the rotor frame, respectively, the air-deflecting member having first, second, third and fourth sides, the first and the second sides being solidly connected to the first and the second end walls, respectively, and the third and the fourth sides being solidly connected to the first and the second cross members, respectively, within the rotor frame.

3. The heat recovery ventilator of claim 2, wherein each of the end walls have a diameter dimension with a midpoint at about the axis of rotation of the rotor, the first and the second side edges of the air-deflecting member being connected to the first and the second end walls, respectively, along the diameters of the end walls, such that when the rotor is rotated the air-deflecting member rotates about the axis of rotation.

4. The heat recovery ventilator of claim 3, wherein the sealing means of said damper assembly includes first, second, third, and fourth sealing members disposed about the rotor and mounted in said damper compartment, the first and the second sealing members flanking the supply opening of said damper compartment and being positioned, configured and dimensioned to substantially contain the supply airstream as it passes from the rotor to the supply opening, the third and the fourth sealing members flanking the exhaust opening and being positioned, configured and dimensioned to substantially contain the exhaust airstream as it passes from the exhaust opening to the rotor, the fourth and the first sealing members flanking the first heat-exchange opening and being positioned, configured and dimensioned to substantially contain the supply or the exhaust airstream as either passes between the rotor and the first heat-exchange opening, and the second and the third sealing members flanking the second heat-exchange opening and being positioned, configured and dimensioned to substantially contain the supply or the exhaust airstream as either passes between the rotor and the second heat-exchange opening.

5. The heat recovery ventilator of claim 4, wherein the first and the third sealing members seal at the cross members of the rotor frame, respectively, when the air-deflecting member is in the first air-deflecting orientation, such that the exhaust airstream flowing between the exhaust opening and the first heat-exchange opening is substantially isolated from the supply airstream flowing between the second heat-exchange opening and the supply opening, and wherein the second and the fourth sealing members seal at the cross members of the rotor frame, respectively, when the air-deflecting member is in the second air-deflecting orientation, such that the exhaust airstream flowing between the exhaust opening and the second heat-exchange opening is substantially isolated from the supply airstream flowing between the first heat-exchange opening and the supply opening.

6. The heat recovery ventilator of claim 5, wherein each of the sealing members includes a sealing plate with a free edge, and an edge seal mounted across the free edge, the edge seal of each sealing member slidably engaging the rotor across the periphery, from the first rim to the second rim, as the rotor rotates about the axis of rotation.

7. The heat recovery ventilator of claim 2, wherein said damper assembly further includes an outer frame having first and second rotor sleeves solidly mounted to front and rear opposing walls of said damper compartment, respectively, the first sleeve encircling and being substantially coaxial with a portion of the rotor frame at about the first rim and the second sleeve encircling and being substantially coaxial with a portion of the rotor frame at about the second rim.

8. The heat recovery ventilator of claim 7, wherein the sealing means of said damper assembly includes first and second sleeve seals, the first sleeve seal being mounted between the first rotor sleeve and the rotor, such that air from the rotor is substantially prevented from passing between the first rotor sleeve and the rotor and escaping said damper compartment, the second sleeve seal being mounted between the second rotor sleeve and the rotor, such that air from the rotor is substantially prevented from passing between the second rotor sleeve and the rotor and entering said damper compartment.

9. The heat recovery ventilator of claim 1, wherein said damper assembly further includes a bearing, associated with the rotor and said damper compartment, supporting the rotor for rotational movement about the axis of rotation.

10. The heat recovery ventilator of claim 9, wherein the bearing is a journal bearing having a pin and bushing, the pin being connected to the second end wall of the rotor and projecting out from the rotor along the axis of rotation, the bushing being connected to a rear wall of said damper compartment, the pin being in rotational engagement with the bushing.

11. The heat recovery ventilator of claim 9, wherein the drive means of said damper assembly includes an electric motor with a rotatable shaft and a mounting element coupled to the shaft, the mounting element being connected to the first end wall of the rotor at about the axis of rotation, such that when the motor is energized, the shaft rotates, causing the mounting element and rotor to rotate about the axis of rotation.

12. The heat recovery ventilator of claim 11, wherein the damper assembly further includes control means, associated with the rotor and the electric motor, for controlling the operation of the rotor, the control means including— sensing means, coupled to the rotor, for sensing the rotational position of the rotor, first switching means, responsive to the sensing means, for switching off electric power to the electric motor and stopping the rotation of the rotor when the sensing means has sensed a position of the rotor that places the air-deflecting member in either the first or the second air-deflecting orientation, timing means, responsive to the first switching means, for timing a predetermined ventilation period beginning when the electric power is switched off by the first switching means, and second switching means, responsive to the timing means, for switching on electric power to the electric motor and resuming the rotation of the rotor, whereby the rotor continues to rotate until the sensing means has again sensed a position of the rotor that places the air-deflecting member in either the first or the second air-deflecting orientation.

13. The heat recovery ventilator of claim 12, wherein the drive means and the control means of said damper assembly cause the rotor to rotate through a 360-degree revolution, in first, second, third and fourth steps of about 90 degrees of rotation each, each step beginning with the rotation of the rotor and ending when the first switching means stops the rotation, the rotor being in first, second, third and fourth rotor positions at the end of the first, second, third and fourth steps, respectively, the air-deflecting member being in the first air-deflecting orientation when the rotor is in the first and third rotor positions and the air-deflecting member being in the second air-deflecting orientation when the rotor is in the second and fourth rotor positions.

14. A heat recovery ventilator for transferring heat energy between an exhaust airstream and a supply airstream of a building that encloses an inside from an outside, said heat recovery ventilator comprising:

an exhaust fan for moving the exhaust airstream from the inside of the building to the outside;

a supply fan for moving the supply airstream from the outside to the inside of the building;

first and second regenerative heat exchangers, each having an outside end coupled to the outside and an inside end, each of said heat exchangers allowing air to pass therethrough between the inside and the outside ends;

a damper compartment containing an exhaust opening, a supply opening, and first and second heat-exchange openings, said compartment being coupled to said exhaust fan and said supply fan via the exhaust and the supply openings, respectively, and said compartment being coupled to the inside ends of said first and said second heat exchangers via the first and the second heat-exchange openings, respectively, such that during operation of said heat recovery ventilator the exhaust airstream is moved into said damper compartment through the exhaust opening and the supply airstream is moved out of said damper compartment through the supply opening; and a damper assembly, situated substantially within said damper compartment, including:
  (i) a rotor, mounted for rotation about an axis of rotation, having—
    a pair of solid end walls disposed in spaced-apart relation along the axis of rotation to define a substantially open circumferential periphery surrounding the axis of rotation, the periphery being substantially aligned and in fluid communication with the exhaust and the supply openings and with the first and the second heat-exchange openings of said damper compartment, and
    an air-deflecting member, solidly connected between the pair of end walls;
  (ii) drive means, coupled to the rotor, for rotating the rotor about the axis of rotation and positioning the air-deflecting member in a first air-deflecting orientation and in a second air-deflecting orientation,
    in the first orientation, the air-deflecting member being positioned to deflect the exhaust airstream from the exhaust opening to the first heat-exchange opening and deflect the supply airstream from the second heat-exchange opening to the supply opening, such that the exhaust airstream is pushed through the first heat exchanger and the supply airstream is pulled through the second heat exchanger,
    in the second orientation, the air-deflecting member being positioned to deflect the exhaust airstream from the exhaust opening to the second heat-exchange opening and deflect the supply airstream from the first heat-exchange opening to the supply opening, such that the exhaust airstream is pushed through the second heat exchanger and the supply airstream is pulled through the first heat exchanger; and
  (iii) sealing means, in slide contact engagement with the rotor, for sealing between the rotor and said damper compartment and for substantially isolating the exhaust airstream from the supply airstream in said damper compartment while the air-deflecting member is in the first or the second air-deflecting orientation.

15. A damper assembly for use with a heat recovery ventilator of the type having first and second regenerative heat exchangers and a damper compartment containing an exhaust opening, a supply opening, and first and second heat-exchange openings, the damper compartment being coupled to the first and the second heat exchangers via the first and the second heat-exchange openings, respectively, said damper assembly comprising:

(a) a rotor, configured to rotate about an axis of rotation within the damper compartment, including—
  (i) a pair of solid end walls disposed in spaced-apart relation along the axis of rotation to define a substantially open circumferential periphery surrounding the axis of rotation, the periphery being configured and dimensioned to substantially align and communicate with the first and the second heat-exchange openings and with the exhaust and the supply openings of the damper compartment, and
  (ii) an air-deflecting member, solidly connected between the pair of end walls:
(b) a bearing element, associated with one of the end walls of said rotor and located at about the axis of rotation, to support rotation of said rotor;
(c) drive means, coupleable to the rotor, for rotating the rotor about the axis of rotation and positioning the air-deflecting member in a first air-deflecting orientation and in a second air-deflecting orientation; and
(d) sealing means, in slide contact engagement with the rotor, for sealing between said rotor and the damper compartment and for substantially isolating the exhaust airstream from the supply airstream in said damper compartment while the air-deflecting member is in the first or the second air-deflecting orientation.

16. The damper assembly of claim 15, wherein said sealing means includes first, second, third, and fourth sealing members disposed about the rotor, the first and the second sealing members being positioned, configured and dimensioned to substantially contain the supply airstream as it passes from the rotor to the supply opening of the damper compartment, the third and the fourth sealing members being positioned, configured and dimensioned to substantially contain the exhaust airstream as it passes from the exhaust opening to the rotor, the fourth and the first sealing members being positioned, configured and dimensioned to substantially contain the supply or the exhaust airstream as either passes between the rotor and the first heat-exchange opening, and the second and the third sealing members being positioned, configured and dimensioned to substantially contain the supply or the exhaust airstream as either passes between the rotor and the second heat-exchange opening.

17. The damper assembly of claim 16, wherein each of the sealing members includes a sealing plate with a free edge and an edge seal mounted across the free edge, the edge seal of each sealing member slidably engaging the rotor across the periphery as the rotor rotates about the axis of rotation.

18. The damper assembly of claim 15, further comprising an outer frame having first and second rotor sleeves, the first and the second rotor sleeves being adapted to mount to front and rear opposing walls of the damper compartment, respectively, and each being configured and dimensioned to encircle and be substantially coaxial with a portion of said rotor.

19. The damper assembly of claim 18, wherein said sealing means includes first and second sleeve seals, the first sleeve seal being mounted between the first rotor sleeve and said rotor, such that, in operation, air from said rotor is substantially prevented from passing between the first rotor sleeve and said rotor, the second sleeve seal being mounted between the second rotor sleeve and said rotor, such that, in operation, air from the rotor is substantially prevented from passing between the second rotor sleeve and said rotor.

20. A method of operating a heat recovery ventilator which transfers heat energy, in alternating periods, between an exhaust airstream and a supply airstream of a building, the building enclosing an inside from an outside, the heat recovery ventilator being of the type having first and second regenerative heat exchangers, a damper compartment coupled to the first and the second heat exchangers, and a damper assembly situated substantially within the damper compartment, the damper assembly including a rotor mounted for rotation about an axis of rotation, the rotor having a pair of solid end walls disposed in spaced-apart relation along the axis of rotation to define a substantially open, circumferential periphery surrounding the axis of rotation, the rotor further having an air-deflecting member solidly connected between the pair of end walls, said method comprising the steps of:

(a) rotating the rotor about the axis of rotation to position the air-deflecting member in a first air-deflecting orientation;

(b) receiving the exhaust airstream from the inside of the building;

(c) moving the exhaust airstream into the damper compartment and in through the periphery of the rotor;

(d) deflecting the exhaust airstream with the air-deflecting member, such that the exhaust airstream flows out through the periphery of the rotor, out of the damper compartment, and into the first heat exchanger;

(e) exchanging heat energy between the exhaust airstream and the first heat exchanger and expelling the exhaust airstream to the outside;

(f) moving the supply airstream from the outside and into the second heat exchanger;

(g) exchanging heat energy between the supply airstream and the second heat exchanger to produce a first conditioned airstream;

(h) moving the first conditioned airstream into the damper compartment and in through the periphery of the rotor;

(i) deflecting the first conditioned airstream with the air-deflecting member, such that the first conditioned airstream flows out through the periphery of the rotor and out of the damper compartment;

(j) moving the first conditioned airstream from the damper compartment to the inside of the building;

(k) rotating the rotor about the axis of rotation to position the air-deflecting member in a second air-deflecting orientation;

(l) repeating steps (b) and (c) and then deflecting the exhaust airstream with the air-deflecting member, such that the exhaust airstream flows out through the periphery of the rotor, out of the damper compartment, and into the second heat exchanger;

(m) exchanging heat energy between the exhaust airstream and the second heat exchanger and then expelling the exhaust airstream to the outside;

(n) moving the supply airstream from the outside and into the first heat exchanger;

(o) exchanging heat energy between the supply airstream and the first heat exchanger to produce a second conditioned airstream;

(p) moving the second conditioned airstream into the damper compartment and in through the periphery of the rotor;

(q) deflecting the second conditioned airstream with the air-deflecting member, such that the second conditioned airstream flows out through the periphery of the rotor and out of the damper compartment;

(r) moving the second conditioned airstream from the damper compartment to the inside of the building; and (s) using a plurality of seals that slidably engage the rotor to seal between the rotor and the damper compartment and to substantially isolate the exhaust airstream from the conditioned airstreams in the damper compartment while the air-deflecting member is in the first or the second air-deflecting orientation.

21. The method of claim 20, wherein the rotor is able to rotate through a 360-degree revolution and stop at first, second, third and fourth rotor positions about 90 degrees apart, the air-deflecting member being in the first air-deflecting orientation when the rotor is in the first and third rotor positions and the air-deflecting member being in the second air-deflecting orientation when the rotor is in the second and fourth rotor positions, and wherein step (a) includes rotating the rotor to the first rotor position, and step (k) includes rotating the rotor to the second rotor position, the method of claim 18 further comprising the steps of:

(t) after step (r), repeating steps (a) through (j) by first rotating the rotor to the third rotor position; and (u) after step (t), repeating steps (k) through (r) by first rotating the rotor to the fourth rotor position.

* * * * *